COMMON CHANNEL TRANSFER ERROR CHECK
Filed Dec. 30, 1959
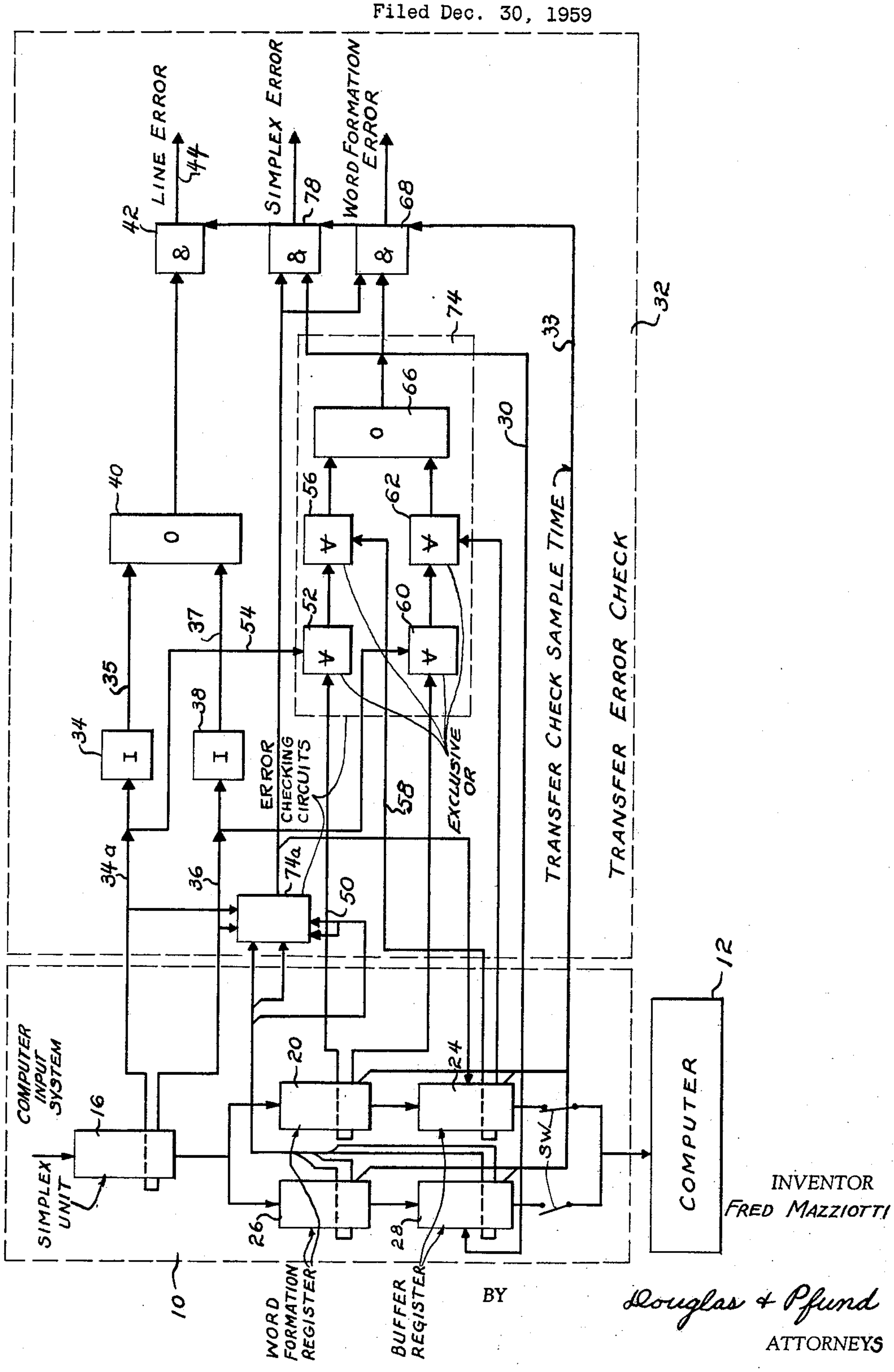
INVENTOR
FRED MAZZIOTTI
BY Douglas & Pfund
ATTORNEYS 3,134,960
Patented May 26, 1964

3,134,960

COMMON CHANNEL TRANSFER ERROR CHECK

Fred Mazziotti, Bethesda, Md., assignor to International Business Machines Corporation, New York, N.Y., a corporation of New York Filed Dec. 30, 1959, Ser. No. 862,857
6 Claims. (Cl. 340—146.1)

The present invention relates to common channel transfer error check circuits and has more particular reference to a device for indicating errors in an input line or in various registers and transfer devices in an input system for a computer.

An object of the present invention is to provide means for generating a word formation error signal, in which the generating means is responsive to error signals from first and second registers or transfer devices for indicating that an error is not in either of these registers but that an error is present in the signal input line.

Another object of the present invention is to provide an error checking circuit that not only detects the presence of errors in an incoming message to a data processing system, but also localizes errors to components within an input system by means of logical circuits. The error checking circuit localizes the presence of the error to at least one of the three major sources of such errors.

Accordingly, the present invention is directed to a circuit arrangement in which a message or phone line error is determined by sampling the line input for a Zero at the time the word is being transferred from the word formation register. The word formation errors are determined by a pair of exclusive OR circuits. The first of the pair of exclusive OR circuits acts to subtract the discarded parity bit from the local word received from the phone line. The second of the pair of exclusive OR circuits then compares the output of the first exclusive OR circuit with a parity signal generated from the word in a buffer register or storage. The output of the second exclusive OR circuit is sampled and an output thereof indicates an error in the word formation register.

Another feature of the invention is that there are two word formation registers with duplicate error checking circuits. The outputs of both of these circuits are fed to an AND gate whose output indicates the presence of an error in the message line or simplex unit, the assumption having been made that if both word formation registers indicate the presence of an error, then the error was in the simplex unit.

Other objects and advantages will be apparent from a detailed description of the invention and from the appended drawing and claims.

The single figure is a schematic diagram of an error checking circuit having a logical circuit for detecting the presence and location of errors in an incoming message data processing system for a system computer in accordance with the present invention.

Referring now to the figure, a computer input system 10 is shown for receiving and accepting an incoming message and processing it for use in a system or central computer 12. The incoming message to the input system may be in the form of a modulated carrier or sine wave having intelligence thereon that is converted to digital bits by analog-to-digital converters, or other type converters or demodulation means. This conversion of the incoming message from sine wave to digital bits is performed in a receiving or simplex unit 16 for each input channel. As the conversion is accomplished for transfer to registers in the input system, a transfer check as described below is made to determine the accuracy of the input system.

The digital bits from the simplex unit 16 form a data word or portions of a data word, and with each portion of a data word there is a single code bit, sometimes referred to as a redundancy bit or a parity bit, to indicate whether the data word as represented by the digital bits, is even or odd.

The data word from the simplex unit 16 is transferred to and accepted by a word formation register 20. The data word is accepted and stored in the word formation register and is transferred to a buffer register 24 before it can be accepted by the central computer 12.

A second word formation register 26 forming a parallel message path with the word formation register 20 also accepts and stores the same data word from the simplex 16. The output of the second word formation register 26 is connected to a second buffer register 28 only if there is error or inoperativeness detected in the first word formation register 20 as indicated by a signal state on a conductor 30. The deriviation of the signal state on conductor 30 as it is applied to buffer register 28 is described below.

During the interval that a data word is being transferred from the word formation register 20 to the buffer register 24, a signal state or level in the input system 10 is present and applied to sample the operation of a transfer error check unit 32. The sample state is present on line 33, and may be called the transfer check sample time.

Generally, the data word may comprise 34 to 36, or more bits. Often the data word is divided into a first and second data half-word, which are sometimes called a left half-word and a right half-word. These left and right half-words each include therewith a parity bit. The data word entering the input system 10 and detected by the simplex unit 16, contains a parity bit for each half-word so that for example, 16 data bits thereof plus the parity bit consist of a counted parity of an odd number represented by a binary parity count of the One state.

An incoming message error, otherwise called a phone line error, is determined by counting the parity of the left half-word and the parity of the right half-word as received from the phone line after the message conversion by the simplex unit 16. The correct parity bit for each half-word produces the One state. The counted parity of the left half-word is connected over line **34*a* to an inverter 34 to produce an output on line 35 which is the reverse or complement of the state of the counted parity. The counted parity of the right half-word is similarly connected over line 36 to an inverter 38 to produce an output on line 37 which is the reverse of the state of the counted parity. The inverters 34, 38 produce a Zero state if the parity count is correct, and the outputs thereof are coupled on lines 35, 37 to an OR circuit 40. The output of the OR circuit 40 is connected to an AND circuit 42 which is sampled by the One state present on line 33 when a data word is being transferred from the word formation register 20 or 26. If an error in counted parity exists for either the left half-word or the right half-word, the One state is present at the output of the AND circuit 42 and there exists a message line or phone line error, since an error in counted parity produces a Zero state in the lines 34***a*, 36. This operates to produce the phone line error indication or signal on line 44 of the One state when there is error on line 34*a* or 36.

Errors in word formation in the word formation register 20 are determined and result to produce a word formation error signal. The parity bit of the left half-word is separated or discarded from the left half-word and applied over line 50 to an exclusive OR circuit 52 which acts to subtract the discarded parity bit from the counted parity of the total left half-word on line 34*a* received from the phone line. The counted parity is connected to the exclusive OR circuit 52 over line 54. The exclusive OR circuit 52 operates to produce an output in the One state when a One state input is applied to one, and only one of its input lines 50, 54. A second exclusive OR circuit 56 is coupled from the output of the exclusive OR circuit 52 and acts to subtract therefrom a parity signal generated from the left half-word that is received from the word formation register 20 and transferred for storage to the buffer register 24. The output of the second exclusive OR circuit 56 is the Zero state indicating there is not error present in the left half-word of the word formation register.

Similar results indicating error or not error present in the right half-word are obtained in a pair of corresponding exclusive OR circuits 60, 62.

If the output of exclusive OR circuits 52, 56, 60, 62 do not compare with the parity signal generated from left and right half-words in the buffer register 24, one of the input legs of an OR circuit 66 is conditioned to pass an output to an AND circuit 68. The conditioned OR circuit 66 indicates that the error was made in the word formation register 20.

If an error is indicated as having been made in the word formation register 20, an output of the OR circuit 66 is connected over line 30 to the buffer register 28 of the input system 10 for switching the input of the central computer 12 to another word formation register 26 and buffer register 28.

The buffer register 24 is checked for correct operation by the parity signal generated from the left and right half-words acting in exclusive OR circuits 52, 54, 60, 62 to subtract the output of the exclusive OR circuits 52, 60 conditioned by the received, or discarded parity of the left and right half-words.

The inputs to the exclusive OR circuit 52 compared with the output produced is given as follows:

| Line 54 | Discarded Parity Bit, Line 50 | Output, Circuit 52 |
|---|---|---|
| 1 | 1 | 0 |
| 0 | 1 | 1 |
| 1 | 0 | 1 |
| 0 | 0 | 0 |

From the above logic it is clear that an error is present in word formation register 20 when the exclusive OR circuit 52 determines that the counted parity on line 54 minus the discarded parity bit is a binary 1 and when the remainder of the half-word, i.e. the half-word without the parity bit, is odd. This indicates an error in the half-word or the discarded parity bit.

The parity signal generated from the half-word in the buffer register 24 is odd or a binary 1 when the half-word has an odd number of bits or One's in it, and is indicative of error having been transferred from the word formation register. The generated parity signal is applied over a line 58 to the exclusive OR circuit 56.

The logic applied to the inputs of exclusive OR circuit 56 compares the result off exclusive OR circuit 52 with the parity signal generated from the left half-word transferred to the buffer register 24 and is given as follows:

| Output, Circuit 52 | Generated Parity, Line 58 | Output, Circuit 56 |
|---|---|---|
| 1 | 1 | 0 $\overline{\text{Error}}$ |
| 1 | 0 | 1 Error |
| 0 | 1 | 1 Error |
| 0 | 0 | 0 $\overline{\text{Error}}$ |

The exclusive OR circuits 52, 56, 60, 62 and the OR circuit 66 comprise a word formation register error checking circuit 74 for the word formation register 20. A similar word formation register error checking circuit 74*a* is provided for the word formation register 26.

The input system 10 is arranged to provide a duplex system in the output of the simplex unit. Since the input system is duplexed, the assumption is made that if the word formation register error checking circuit 74 for the word formation register 20 indicates a word formation error, then a similar word formation register error checking circuit 74*a* will be connected by a signal state on conductor 30 to indicate a word formation error. The output of each word formation register error checking circuits 74 and 74*a* provides levels to condition an AND circuit 78 gated by the sample time signal on line 33. An output of the AND circuit 78 indicates an error in the simplex unit at the sample time. The logic of the simplex error indication at the output of the AND circuit 78 is that if each duplex arrangement in the input system indicates a word formation error, then the simplex unit connected in common to the word formation registers is the location of the error.

It should be understood, however, that the specific apparatus herein illustrated and described is intended to be representative only, as many changes may be made therein without departing from the clear teachings of the invention. Accordingly, reference should be made to the following claims in determining the full scope of the invention.

What is claimed is:

1. An apparatus for indicating the presence of error in an input channel for a computer comprising a data receiving means for producing a data word signal including data bits and a parity bit and for developing a counted parity signal of the data word, a word formation register coupled to the data receiving means for storing the data word signal therein and to produce a signal indicative of the parity bit, a buffer register coupled to the formation register for storing the data word signal without the parity bit and to produce a generated parity bit signal indicative of the parity of the word, a first exclusive OR circuit responsive to the counted parity signal and to the word formation register for comparing the counted parity of the data receiving means with the parity bit of the word formation register and producing an output signal, and a second exclusive OR circuit responsive to the output signal of the first exclusive OR circuit and the buffer register for comparing the output signal of the first exclusive OR circuit with the generated parity bit signal of the buffer register, the output signal of the second exclusive OR circuit indicative of the presence of an error in the word formation register.

2. An apparatus for indicating an error in transfer of data words from one transfer device to another transfer device comprising a first transfer device for receiving a signal and producing a data word signal representative of data bits and a parity bit, said first transfer device having means for counting the parity of the data word signal and producing an indication of the count, a second transfer device for receiving the data word signal and producing separately signal representations of the data bits and the parity bit, a third transfer device for receiving the signal representations of the data bits for storage and generating a parity signal representative of the data bits, a first exclusive OR circuit responsive to the data word signal of the first transfer device and to the produced signal of the second transfer device for comparing the counted parity produced by the first transfer device with the parity bit of the second transfer device and producing an output signal, a second exclusive OR circuit responsive to the output of the first exclusive OR circuit and to the generated parity signal of the third transfer device for comparing the output of the first exclusive OR circuit with the generated parity signal of the third transfer device, the output of the second exclusive OR circuit indicating the presence of an error in the second transfer device.

3. An apparatus for indicating the presence of error in an input channel of a computer comprising a data receiving means for producing a signal representative of a plurality of half-words, each half-word including data bits and a parity bit, and for producing an output signal representative of a counted parity for each half-word, a word formation register responsive to the signals produced in the data receiving means for storing the half-words and to produce a signal indicative of the parity bit of each half-word, a buffer register responsive to the signals produced in the data receiving means to store the signal representative of the half-words without their parity bits and to produce a generated parity signal for each half-word indicative of the parity of the half-word, first exclusive OR circuits responsive to the signals of the data receiving means and to the produced signal of the word formation register for comparing the counted parity of the respective half-words of the word formation register and producing an output signal, and second exclusive OR circuits responsive to the output signal of the first exclusive OR circuits and to the output signal of the buffer register for comparing the output signal of the respective first exclusive OR circuits with the generated parity signal of the respective half-words of the buffer register and producing an output signal, and the output signal of the respective second exclusive OR circuits indicative of the presence of an error in the word formation register.

4. An apparatus for indicating the presence of error in an input channel of a computer comprising a data receiving means for producing a signal representive of a plurality of half-words, each half-word including data bits and a parity bit and for developing an output signal representative of a counted parity for each half-word, a word formation register responsive to the signal representing the half-words of the data receiving means for storing the half-words and to produce an output signal indicative of the parity bit of each half-word and producing an output, a buffer register responsive to the signal output of the word formation register for storing the half-words without the parity bit and to produce a generated parity signal for each half-word indicative of the parity of each half-word, first exclusive OR circuits responsive to the output signal of the data receiving means and to the output signal of the word formation register for comparing the counted parity of the respective half-words of the data receiving means with the parity bit of the respective half-words of the word formation register and producing an output signal, second exclusive OR circuits responsive to the output signal of the respective first exclusive OR circuits and to the output of the buffer register for comparing the output signal of the respective first exclusive OR circuits with the generated parity signal of the respective half-words of the buffer register and producing an output signal, an OR circuit responsive to the output of the respective second exclusive OR circuits and producing an output signal indicative of the presence of an error in the word formation register, and comparing means responsive to the signal output of the data receiving means and to the output signal of the OR circuit for producing a signal in the absence of a counted parity of any of the respective half-words, the output of said comparing means indicative of the presence of an error in the data receiving means.

5. An apparatus for indicating the presence of error in an input channel of a computer comprising data receiving means for producing a signal representative of a plurality of half-words, each half-word including data bits and a parity bit and for developing an output signal representative of a counted parity for each half-word, a word formation register responsive to the output signal of the data receiving means for storing signals representative of the half-words and to produce an output signal indicative of the parity bit of each half-word, a buffer register responsive to the output signal of the word formation register for storing signals representative of the half-words without the parity bit and to produce a generated parity signal for each half-word indicative of the parity of each half-word, first exclusive OR circuits responsive to the output signals of the data receiving means and to the word formation register to compare the counted parity of the respective half-words of the data receiving means with the parity bit of the respective half-words of the word formation register and produce an output signal, second exclusive OR circuits responsive to the output signals of the first exclusive OR circuits and of the buffer register to compare the output signals of the first exclusive OR circuits with the generated parity of the respective half-words of the buffer register and produce an output signal, the output signal of the second exclusive OR circuits indicative of the presence of an error in the word formation register, comparing means coupled to the output signals of the second exclusive OR circuits and responsive to the absence of a counted parity of any of the respective half-words, the output of said comparing means indicative of the presence of an error in the data receiving means, a second word formation reigster also responsive to the output signal of the data receiving means for storing signals representative of the half-words and to produce an output signal indicative of the parity bit of each half-word, a second buffer register responsive to the output signal of the second word formation register for storing signals representative of the half-words without the parity bit and to produce a generated parity signal for each half-word indicative of the parity of each half-word, third exclusive OR circuits responsive to the output signals of the data receiving means and to the second word formation register to compare the counted parity of the respective half-words of the data receiving means with the parity bit of the respective half-words of the second word formation register and produce an output signal, and fourth exclusive OR circuits responsive to the output signals of the third exclusive OR circuits and of the second buffer register to compare the output signals of the third exclusive OR circuits with the generated parity bit of the respective half-words of the second buffer register and produce an output signal, the output signal of the third exclusive OR circuits indicative of the presence of an error in the second word formation register, and AND circuit means responsive to the output signals of the second and fourth exclusive OR circuits for providing output signals responsive to output signals from the second and fourth exclusive OR circuits indicative of the presence of an error in the data receiving means.

6. An apparatus for indicating the presence of error in an input channel comprising signal means producing a signal representative of the counted parity of a data word and including a parity bit comparing means for receiving said signal from said signal means when applied to the input channel and producing an output signal indicative of the presence of an error in the received signal, first and second exclusive OR circuits coupled responsively to the signal means to compare signals representative of the counted parity of the data word with the parity bit of the data word, third and fourth exclusive OR circuits coupled responsively to the signal means and the first and second exclusive OR circuits to compare the output signals of the first and second exclusive OR circuits with signals representative of the generated parity of the data word minus the parity bit, the output signals of the third and fourth exclusive OR circuits indicative of the presence of an error in the signal means in producing the data word to a data word minus the parity bit, and an OR circuit connected to the output signals of the third and fourth exclusive OR circuits to provide an output signal indicative of the presence of an error in the signal means when producing the data word from a data word signal to a data word.

References Cited in the file of this patent

UNITED STATES PATENTS

| | | |
|---|---|---|
| 2,848,607 | Maron | Aug. 19, 1958 |
| 2,871,289 | Cox | Jan. 27, 1959 |
| 2,958,072 | Batley | Oct. 25, 1960 |